(12) United States Patent
Krishnan

(10) Patent No.: US 8,585,997 B2
(45) Date of Patent: Nov. 19, 2013

(54) PROCESS AND AN APPARATUS FOR CONVERTING SOLID ORGANIC MATERIALS INTO CARBON OR ACTIVATED CARBON

(76) Inventor: Balu Ravi Krishnan, Trivandrum (IN)

(*) Notice: Subject to any disclaimer, the term of this patent is extended or adjusted under 35 U.S.C. 154(b) by 163 days.

(21) Appl. No.: 12/998,641

(22) PCT Filed: Nov. 18, 2008

(86) PCT No.: PCT/IN2008/000774
§ 371 (c)(1),
(2), (4) Date: May 12, 2011

(87) PCT Pub. No.: WO2010/058408
PCT Pub. Date: May 27, 2010

(65) Prior Publication Data
US 2011/0212015 A1    Sep. 1, 2011

(51) Int. Cl.
*C01B 3/08*    (2006.01)
(52) U.S. Cl.
USPC .................................. 423/445 R; 422/119
(58) Field of Classification Search
USPC .................................. 422/119; 423/445 R
See application file for complete search history.

(56) References Cited

U.S. PATENT DOCUMENTS

| | | |
|---|---|---|
| 2004/0038802 A1 | 2/2004 | Von Blucher et al. |
| 2007/0101912 A1 | 5/2007 | Kohchi et al. |

FOREIGN PATENT DOCUMENTS

| | | | |
|---|---|---|---|
| GB | 316 222 | | 7/1929 |
| JP | 2003 095 629 A | | 4/2003 |
| JP | 2003226513 A | * | 8/2003 |
| WO | WO 01/49604 | | 7/2001 |

OTHER PUBLICATIONS

Machine English translation of JP2003226513.*

* cited by examiner

*Primary Examiner* — Stanley Silverman
*Assistant Examiner* — Richard M Rump
(74) *Attorney, Agent, or Firm* — D. Peter Hochberg; Sean F. Mellino; Richard A. Wolf

(57) ABSTRACT

A process and an apparatus for converting solid organic materials into carbon or activated carbon. The processing of solid organic materials is oxygen-free and wholly under endothermic condition. The apparatus comprises a pressure vessel (1), thermal insulation with protective cladding for pressure vessel (2), a perforated or non-perforated rotary drum (3), a sealed dish end (4), a rotating shaft (5), a geared motor with belt or chain drive (6), a steam super heater (7) for generating superheated steam, at least one inlet valve (8) for regulating the super heated steam, at least one feed pipe (9), tilting or swivel support (10), at least one cylindrical roller (11), an open or close door end (12), a feeding or removal port (13), a connecting chute (14), at least one pressure safety valve (15), a gas exit pipe (16), at least one outlet valve (17), a gas treatment unit (18) for treating the generated reaction gases, at least one pressure gauge (19) and at least one temperature indicator (20). The pressure vessel is tilted along with its accessories supported on a tilting or swivel support and solid organic materials are feeded into the rotary drum and then realigned. Gas or steam is feeded inside the pressure vessel till the entire air inside the pressure vessel is purged out and thereafter superheated steam continuously feeded into the rotary drum. The rotary drum is constantly rotated by geared motor and generated reaction gases are evacuated from the pressure vessel to the gas treatment unit wherein the organic solid materials are converted into carbon or activated carbon.

41 Claims, 2 Drawing Sheets

PROCESS AND AN APPARATUS FOR CONVERTING SOLID ORGANIC MATERIALS INTO CARBON OR ACTIVATED CARBON

TECHNICAL FIELD OF THE INVENTION

The invention relates to a process and an apparatus for converting solid organic materials into carbon or activated carbon. The invention generally relates to a process and an apparatus for drying or seasoning or pyrolysing or gasification or carbonization of solid organic materials utilizing gas or steam or superheated steam, and more particularly, an oxygen-free processing of solid organic materials utilizing superheated steam wholly under endothermic condition.

BACKGROUND OF THE INVENTION

The traditional and conventional process adopted for conversion of solid organic materials into carbon is by partly or wholly under exothermic condition. The process for conversion of solid organic materials into carbon varies from vertical retort batch processing type to rotary kiln batch or continuous processing type. Such types of processing are partly or wholly under exothermic condition. Also, such type of exothermic process involves a two-step process:
(a) The first step involves carbonization of the solid organic materials (i.e. raw materials) under partial oxidation condition.
(b) The second step involves activation of the carbonized material upon reaction with steam under partial or wholly exothermic condition in another similar vertical retort or rotary kiln.

The disadvantages for the above-mentioned type of processing are as follows: (a) Carbonization of solid organic materials (i.e. raw materials) either in a vertical retort or rotary kiln under partial oxidation is very unstable and difficult to control the process due to exothermic reaction. (b) Such type of carbonization process cannot be automated due to the varying nature and quality of the raw material and hence relies more on the skill and experience of the operator. (c) Partial oxidation of solid organic materials results in emission of wide range of toxic gases which are extremely difficult to treat. (d) Yield of the raw materials to the finished products (i.e. carbon) is high and will not be consistent always. (e) Ash content of the carbon will be high (due to processing of material under partial oxidation) resulting in lower quality and lower physical strength of the carbon product. (f) Direct conversion of the solid organic materials to activated carbon is very difficult under exothermic conditions.

DISCLOSURE OF THE INVENTION

In order to solve the above-described problem, the present invention provides a process and an apparatus for converting solid organic materials into carbon or activated carbon.

The object of the present invention is to provide a process and an apparatus for drying or seasoning or pyrolysing or gasification or carbonization of solid organic materials utilizing gas or steam or superheated steam.

A further object of the present invention is to provide an oxygen-free processing of solid organic materials utilizing superheated steam wholly under endothermic condition.

Another object of the present invention is to provide a process and an apparatus for converting solid organic materials into carbon or activated carbon, wherein the apparatus is simple in construction and in turn easy to operate and less costly.

The several other types of processes which can also be adopted for processing of solid organic materials in the apparatus are as follows:

Drying: Drying is the process wherein the material is subjected to steam temperature between 180° C. to 220° C., preferably 200° C. with pressure at 1 to 5 bar in the pressure vessel depending upon the nature or type of materials.

Seasoning: Seasoning is mainly for removal of moisture or water content in the material at steam temperature between 150° C. to 250° C. with pressure between 5 to 10 bar in the pressure vessel depending upon the nature or type of materials.

Pyrolysing: Pyrolysing is the process where the material is subjected to thermal decomposition by breaking down the molecular bonds with superheated steam at temperature between 450° C. to 750° C. depending upon the nature or type of material. Pressure will be between 1 to 5 bar onwards in the pressure vessel.

Gasification: Gasification is the process by which material with high calorific value can be subjected to a combination of pressure and temperature with superheated steam at temperatures ranging from 450° C. to 750° C. and pressure at 1 to 5 bar with longer duration of processing time. Reaction gases thus generated under pressure can be utilized as a renewable fuel.

Carbonization: Carbonization is the process in which the material is subjected to high temperature with superheated steam at temperatures in the range of 600 to 750° C. and at partial pressures in the range of 1 to 3 bar thus driving out the volatile matter present in the organic material.

Upon continuing the process the material gets converted into carbon or activated carbon. The reaction gases are continuously evacuated from the apparatus till the completion of the process. The different type of process mentioned above depends upon the nature or type of solid organic materials processed. Hence, the apparatus is adopted for different type of processes by varying the following eight parameters: 1. Rotation (RPM) of the perforated or non-perforated rotary drum; 2. Pressure of gas or steam or superheated steam; 3. Temperature of gas or steam or superheated steam; 4. Processing time or duration depending upon the nature or type of process; 5. Flow rate of gas or steam or superheated steam; 6. Pressure or temperature in the pressure vessel; 7. Nature of gas or fluid input (gases or fluids other than steam or superheated steam); and 8. Nature or quantity or type of materials (organic or inorganic, solid or semi-solid).

The process and the apparatus of the present invention can also be utilized for processing of any other type of material other than solid organic material such as inorganic material like chemicals or rubber tyre or bio-medical waste or residential or municipal waste, etc; depending upon the nature or quantity or type of material.

The pressure vessel which is cylindrically shaped vessel or container is horizontally mounted on tilting or swivel support to facilitate up and down tilting movements. The material of construction of the pressure vessel may be either mild or stainless steel of thick walled metal with a non-corrosive, heat, acid and chemical resistant inner lining to withstand high temperature and pressure. The pressure vessel has an open or close door mechanism at one end for feeding or removal of material. The other end of the pressure vessel has a sealed dish end. The pressure vessel houses inside it a rotary drum and feed pipe(s) fitted with nozzle(s)/valve(s). The outer surface of the whole pressure vessel including the open or close door end and sealed dish end is thermally insulated. The pressure vessel is also fitted with pressure safety valve(s), pressure gauge(s) and temperature indicator(s).

The thermal insulation with protective cladding for pressure vessel including the door end and sealed dish end is wrapped or covered with high density thermal ceramic fiber blankets on the outer to prevent or reduce heat loss. Protective cladding or covering for the thermal ceramic fiber insulation blankets are provided to protect it from external damage.

The rotary drum is either perforated drum or non-perforated drum. The perforated rotary drum is a cylindrically shaped drum with a conical mouth made of perforated sheet or mesh mounted horizontally with one end coupled to a rotating shaft and the other end supported on cylindrical rollers and altogether encased inside the pressure vessel.

The non-perforated rotary drum is a cylindrically shaped drum with a conical mouth and can be mounted either horizontally or vertically depending upon the nature and type of material to be processed and with one end coupled to a rotating shaft and the other end supported on cylindrical rollers and encased inside the pressure vessel.

The annular space between the rotary drum for both perforated & non-perforated and the pressure vessel is kept at the bare minimum possible. One end of the rotary drum for both perforated & non-perforated is sealed and this sealed end is connected or coupled to the rotating shaft. The other end of the rotary drum for both perforated & non-perforated having a conical mouth end is for feeding of material into the rotary drum. The conical mouth end of the rotary drum is supported on cylindrical rollers so as to rotate freely inside the pressure vessel. The material of construction of the rotary drum can be either mild or stainless steel or any other material having good resistance to high temperature, pressure, corrosion or abrasion and any acid and chemical reactions.

The sealed dish end is either welded or flange bolted to the pressure vessel. The sealed dish end can also be attached to the pressure vessel by any other fastening means. The material of construction of the sealed dish end can be either mild or stainless steel of thick walled metal with a non-corrosive, heat & acid resistant inner lining to withstand high temperature and pressure. The sealed dish end houses the rotating shaft along with its bearing or housing, geared motor with chain or pulley drive coupled to the rotating shaft, inlet valve(s), outlet valve(s), pressure gauge(s) and temperature indicator(s). The outer of the sealed dish end is thermally insulated with thermal ceramic fiber blankets with protective cladding or covering.

The rotating shaft is made of hardened mild or stainless steel cylindrical shaft mounted at the center of the sealed dish end of the pressure vessel. The outer end of the rotating shaft is connected to a belt or chain drive coupled to a geared motor. The RPM of the rotary drum is regulated by the geared motor.

For perforated & non-perforated rotary drum, the inner end of the rotating shaft is coupled to the sealed end of the rotary drum inside the pressure vessel. However, for non-perforated rotary drum type, the rotating shaft has a gas or steam or superheated steam feed pipe running through its centre which further extends to the inside of the non-perforated rotary drum. The gas or steam or superheated steam feed pipe inside the rotating shaft is thermally insulated to prevent any transmission of heat to the rotating shaft and also remains stationary in its position i.e., it does not rotate along with the rotating shaft. The gland of the rotating shaft is well sealed to prevent any steam or gas leakage's even under high pressure. As constant heat is developed during processing of solid organic materials in the apparatus, hence to prevent the rotating shaft from seizing; the bearing or housing of the shaft is constantly cooled by a cooling mechanism. The bearing or housing of the rotating shaft will have a casing surrounding it. This casing will be continuously filled with a liquid coolant of very low vaporization content which in turn will continuously cool the rotating shaft. The liquid coolant will be constantly recirculated.

The geared motor is coupled to the rotating shaft by a belt or chain drive vide pulley or chain sprocket. The geared motor is mounted on supports bolted or welded or by any other fastening means to the outer wall of the sealed dish end of the pressure vessel. RPM of the rotating shaft is regulated by varying either the speed of the geared motor or the dimensions of the pulley or chain sprocket.

The steam superheater is not an integral part of the apparatus. The steam superheater performs the function of raising the temperature of steam between 200° C. to 750° C. In the apparatus, superheated steam generated from the steam superheater is at temperatures 450-750° C. which flows through the feed pipe inside the pressure vessel and further through nozzle(s) or valve(s).

The inlet valve(s) is for passing steam or superheated steam. The inlet valve(s) are fitted to the sealed dish end of the pressure vessel. The flow of superheated steam from the steam superheater is regulated by the inlet valve(s) before entry into the feed pipe fitted with nozzle(s) or valve(s) inside the pressure vessel.

The feed pipe is fitted with nozzle(s) or valve(s) inside pressure vessel. For perforated rotary drum, feed pipe fitted with nozzle(s) or valve(s) anchored to the pressure vessel is located below the whole length of the rotary drum. The feed pipe fitted with nozzle(s) or valve(s) anchored to the pressure vessel is located below either in a straight line or in a zigzag manner or in any other manner running alongside the whole length of the rotary drum.

Only at the inside of the non-perforated rotary drum, the nozzle(s) or valve(s) are fitted on the feed pipe. The feed pipe inside the non-perforated rotary drum can be either in a straight line or in a zigzag manner or in any other manner running alongside the whole length of the non-perforated rotary drum. The length of feed pipe at the entry point of the non-perforated rotary drum need not necessarily be extended inside the non-perforated rotary drum; but can even be restricted at the entry point itself or can be varied depending upon the nature or quantity or type of the solid organic materials to be processed.

Superheated steam generated from the steam superheater at temperatures in the range of 450-750° C. flows through the feed pipe and further through the series of nozzle(s) or valve(s). The nozzle(s) or valve(s) in the feed pipe are arranged to provide uniform distribution of the superheated steam at equal temperature and pressure throughout the whole length of the Rotary Drum. The superheated steam thus comes into direct contact with the solid organic materials inside the rotary drum during the process.

The tilting or swivel support is for tilting of the whole pressure vessel and its accessories. For smooth and easier feed or removal of the solid organic materials in the rotary drum fitted inside the pressure vessel, the whole pressure vessel is mounted on tilting or swivel support that permits tilting of the pressure vessel upwards or downwards. For feeding of the solid organic materials inside the rotary drum, the pressure vessel will be tilted upwards in the range of 30° angle to 60° angle from its horizontal position at 180° angle with either the door of the pressure vessel or the feeding or removal port in open position depending upon the dimension of the solid organic materials to be fed in the rotary drum.

During process of the solid organic materials, the pressure vessel with perforated rotary drum is maintained in the horizontal position at 180° angle. However, for non-perforated rotary drum, the pressure vessel can be positioned either in horizontal at 180° angle or vertical at 90° angle or at any suitable angle or position depending upon the need of the process. Similarly, for removal of the solid organic materials, the whole pressure vessel is tilted downward in the range of 30° angle to 60° angle from its horizontal position at 180° angle.

The cylindrical rollers are designed to support and keep the conical mouth end of the rotary drum centrally aligned for the rotary drum to rotate freely inside the Pressure Vessel. The cylindrical rollers are fitted on to the inside walls of the pressure vessel so as to share and balance the load of the rotary drum with the solid organic materials to ensure smooth rotation of the rotary drum. The material of cylindrical rollers are designed to withstand heavier loads and resistance to abrasion, wear & tear, metal fatigue, temperature, pressure and other chemical or acid reactions.

The open or close door is hinged at the edge of the pressure vessel to facilitate feeding or removal of solid organic materials of larger dimension into or from the rotary drum. However, for feeding or removal of solid organic materials of smaller dimension, the open or close door has a feeding or removal port with connecting chute at its centre. The open or close door is designed to prevent any leakages under high pressure or temperature. The material of construction of the open or close door is either mild or stainless steel of thick walled metal with a non-corrosive, heat and acid resistant inner lining to withstand high temperature and pressure. The outer of the open or close door is thermally insulated with thermal ceramic fiber blankets with protective cladding or covering.

The feeding or removal port is centrally located on the open or close door of the Pressure Vessel. The feeding or removal port is to facilitate quick and easier feeding or removal of solid organic materials of smaller dimension inside the rotary drum. The feeding or removal port has a retractable connecting chute to link or connect the conical mouth end of the rotary drum through which the solid organic materials flows. The door of the feeding or removal port is designed to withstand high temperature, pressure and has a sealing mechanism to prevent any leakages.

The connecting chute is a hollow cylindrical pipe or tube whose diameter will be less than the diameter of the conical mouth of the rotary drum so that it does not hamper the free rotation of the rotary drum during feeding or removal of the solid organic materials. The connecting chute is of retractable type. It is to facilitate the link between the feeding or removal port and the conical mouth end of the rotary drum. During feeding or removal of the solid organic materials only the connecting chute is linked.

In the case of non-perforated rotary drum, during processing of the solid organic materials, the connecting chute is retracted inside the feeding or removal port so as to allow the reaction gases to flow out of the non-perforated rotary drum for evacuation from the pressure vessel through the gas exit pipe. The material of the connecting chute is either mild or stainless steel or any other material capable of withstanding heavier loads and resistance to abrasion, wear & tear, metal fatigue, temperature, pressure and other chemical or acid reactions.

The pressure safety valve(s) are mounted on the pressure vessel to safeguard the apparatus from excessive pressure build-up during its operation. The gas exit pipe is fitted on the sealed dish end of the pressure vessel. It may also be located on the outer of the pressure vessel wall. Reaction gases generated during the process exits from the pressure vessel through this gas exit pipe. The outlet valve(s) is fitted to the gas exit pipe mounted on the pressure vessel. Reaction gases exits from the pressure vessel via the outlet valve(s). The outlet valve(s) regulates the pressure and flow of reaction gases generated during the process of the solid organic materials. The gas treatment unit is not an integral part of this apparatus. Reaction gases generated in the apparatus during the process are treated in this unit. Treatment of reaction gases varies depending upon the nature or quantity or type of solid organic materials loaded and the process adopted. The pressure gauge(s) indicates the pressure level in the pressure vessel and can be mounted on the outer wall of the pressure vessel. The processing of solid organic materials is regulated by the readings of the pressure gauge(s). The temperature indicator(s) are located on (the outer wall of the pressure vessel. Temperature indicator(s) provide the readings of the temperature of the reaction gases or steam or superheated steam inside the pressure vessel. The processing of solid organic materials is regulated by the readings of the temperature indicator(s).

The present invention provides a process for converting solid organic materials into carbon or activated carbon, comprising the steps of: tilting the pressure vessel having thermal insulation along with its accessories supported on a tilting or swivel support; feeding the solid organic materials to be processed through the feeding or removal port via the connecting chute into the perforated or non-perforated rotary drum encased inside the pressure vessel; realigning the pressure vessel to its horizontal position when the perforated or non-perforated rotary drum is fully loaded with the solid organic materials; feeding gas or steam inside the pressure vessel till the entire air inside the pressure vessel is purged out; feeding superheated steam continuously via the inlet valve and through the feed pipe fitted with nozzles or valves into the perforated or non-perforated rotary drum thus coming into direct contact with the solid organic materials; rotating constantly the perforated or non-perforated rotary drum by geared motor with belt or chain drive coupled to the rotating shaft for ensuring uniform direct contact between superheated steam and the solid organic materials; evacuating continuously the generated reaction gases from the pressure vessel through the gas exit pipe via the outlet valve to the gas treatment unit; unloading the processed material i.e. carbon or activated carbon on completion of the process from the perforated or non-perforated rotary drum via the connecting chute and through the feeding or removal port by tilting the pressure vessel downwards and upon maintaining continuous rotation of the perforated or non-perforated rotary drum.

The present invention according to the first embodiment provides an apparatus for converting solid organic materials into carbon or activated carbon, comprising: a pressure vessel horizontally mounted on tilting or swivel support for up and down tilting movements; a perforated rotary drum having a conical mouth encased inside said pressure vessel; a sealed dish end is attached to said pressure vessel at one end; a rotating shaft is mounted at the center of said sealed dish end; a geared motor with belt or chain drive is coupled to said rotating shaft vide pulley or chain sprocket; a steam super heater for generating superheated steam; at least one inlet valve fitted to said sealed dish end for regulating the super heated steam; at least one feed pipe having nozzles or valves is placed below the whole length of said perforated rotary drum; at least one cylindrical roller for supporting and keeping said conical mouth end of said perforated rotary drum centrally aligned for rotating freely inside said pressure vessel; an open or close door end at another end of said pressure vessel for feeding or removing solid organic materials of larger dimension into or from said perforated rotary drum; a feeding or removal port centrally located on said open or close door end for feeding solid organic materials of smaller dimension inside said perforated rotary drum; a connecting chute having smaller diameter than said conical mouth of said perforated rotary drum for facilitating free rotation of said perforated rotary drum during feeding or removal of the solid organic materials; at least one pressure safety valve is mounted on said pressure vessel to safeguard said apparatus from excessive pressure build-up during its operation; a gas exit pipe is fitted on said sealed dish end for out flow of reaction gases generated from said pressure vessel; at least one outlet valve fitted to said gas exit pipe for regulating the pressure and flow of reaction gases generated during the processing of the solid organic materials; a gas treatment unit for treating the generated reaction gases; at least one pressure gauge is mounted on the outer wall of said pressure vessel for indicating the pressure level in said pressure vessel; and at least one temperature indicator is mounted on the outer wall of said pressure vessel for indicating the temperature of the gas or steam or superheated steam inside said pressure vessel.

The present invention according to the second embodiment provides an apparatus for converting solid organic materials into carbon or activated carbon, comprising a pressure vessel horizontally mounted on tilting or swivel support for up and down tilting movements; a non-perforated rotary drum having a conical mouth encased inside said pressure vessel; a sealed dish end is attached to said pressure vessel at one end; a rotating shaft is mounted at the center of said sealed dish end; a geared motor with belt or chain drive is coupled to said rotating shaft vide pulley or chain sprocket; a steam super heater for generating superheated steam; at least one inlet valve fitted to said sealed dish end for regulating the super heated steam; at least one feed pipe having nozzles or valves inside said non-perforated rotary drum is placed at the centre of said rotating shaft and extends to the whole length inside of said non-perforated rotary drum, said feed pipe is thermally insulated to prevent transmission of heat and remains stationary; at least one cylindrical roller for supporting and keeping said conical mouth end of said non-perforated rotary drum centrally aligned for rotating freely inside said pressure vessel; an open or close door end at another end of said pressure vessel for feeding or removing solid organic materials of larger dimension into or from said non-perforated rotary drum; a feeding or removal port centrally located on said open or close door end for feeding solid organic materials of smaller dimension inside said non-perforated rotary drum; a connecting chute having smaller diameter than said conical mouth of said non-perforated rotary drum for facilitating free rotation of said non-perforated rotary drum during feeding or removal of the solid organic materials; at least one pressure safety valve is mounted on said pressure vessel to safeguard said apparatus from excessive pressure build-up during its operation; a gas exit pipe is fitted on said sealed dish end for out flow of reaction gases generated from said pressure vessel; at least one outlet valve fitted to said gas exit pipe for regulating the pressure and flow of reaction gases generated during the processing of the solid organic materials; a gas treatment unit for treating the generated reaction gases; at least one pressure gauge is Mounted on the outer wall of said pressure vessel for indicating the pressure level in said pressure vessel; and at least one temperature indicator is mounted on the outer wall of said pressure vessel for indicating the temperature of the gas or stream or superheated steam inside said pressure vessel.

BRIEF DESCRIPTION OF THE DRAWINGS

The advantages and features of the invention will become more clearly apparent from the following description which refers to the accompanying drawings given as non-restrictive examples only and in which.

DETAILED DESCRIPTION OF THE PREFERRED EMBODIMENTS

Figure 1:
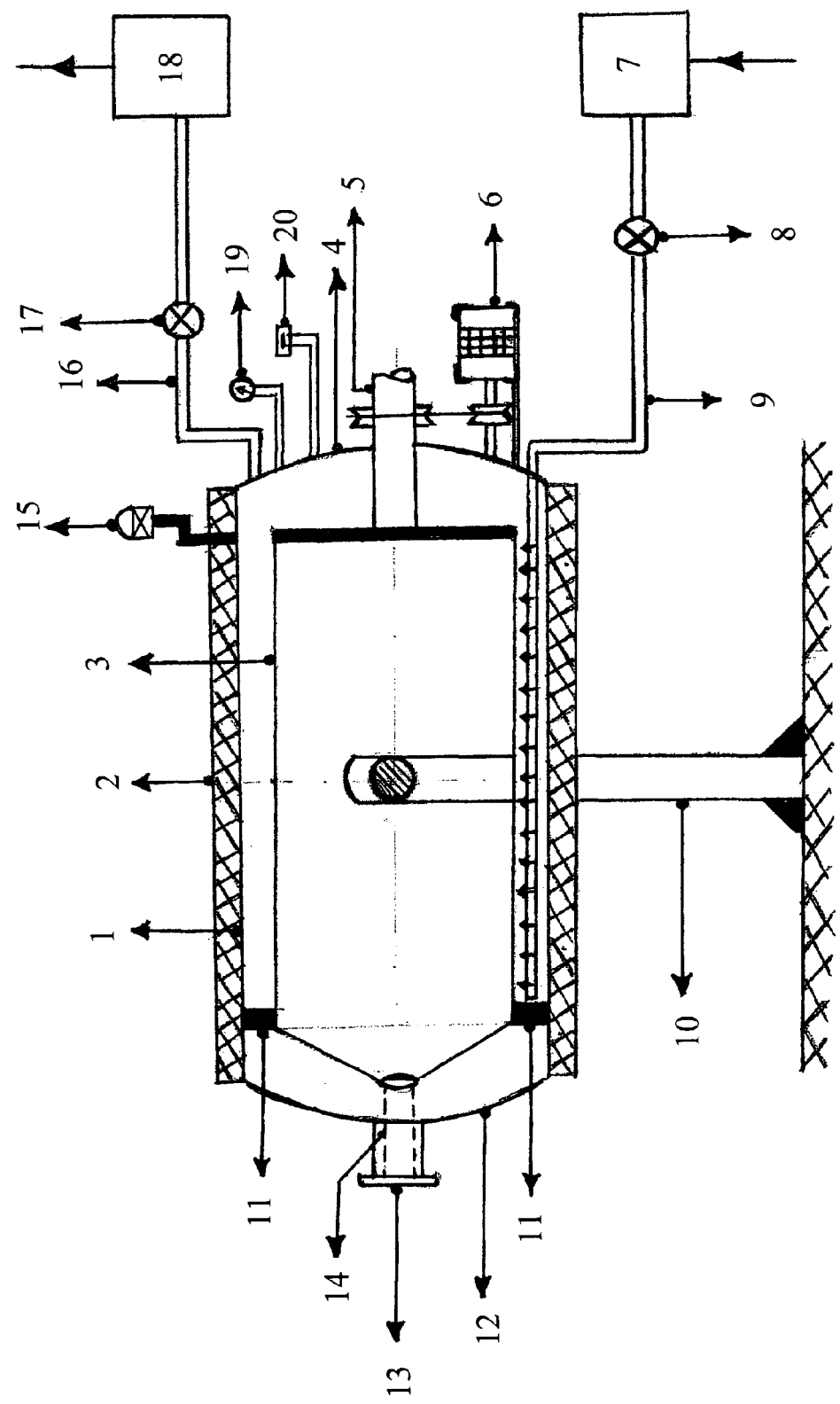
FIG. 1 illustrates the front view of the apparatus for converting solid organic materials into carbon or activated carbon having perforated rotary drum according to first embodiment.

Referring to FIG. 1, to prevent heat loss, thermal insulation with protective cladding 2 is provided on the outer wall of the pressure vessel 1. Before feeding of the solid organic materials, the whole pressure vessel 1 along with its accessories supported on a tilting or swivel support 10 is tilted upwards in the range of 30° angle to 60° angle from its horizontal position at 180° angle. From the open or close door end of the pressure vessel 12, the solid organic materials is fed through the feeding or removal port 13 via the connecting chute 14 into the perforated rotary drum 3 encased inside the pressure vessel 1. During feeding of the solid organic materials, the rotation of the perforated rotary drum 3 is maintained at a specified RPM so as to facilitate uniform feed of the solid organic materials throughout the length of the perforated rotary drum 3. Rotation of the perforated rotary drum 3 is by geared motor with belt or chain drive 6 coupled to the rotating shaft 5. The outer end of the rotating shaft 5 housed at centre of the sealed dish end 4 of the pressure vessel 1 is coupled to the geared motor with belt or chain drive 6. The inner end of the rotating shaft 5 is coupled to the sealed end of the perforated rotary drum 3. The gland of the rotating shaft 5 is well sealed to prevent any steam or gas leakages even under high pressure.

As constant heat is developed during processing of the solid organic materials in the apparatus, hence to prevent the rotating shaft 5 from seizing; the rotating shaft 5 and its bearing or housing is constantly cooled by a cooling mechanism. After the solid organic materials is loaded into the perforated rotary drum 3, the door of the feeding or removal port 13 is closed tightly to prevent any leakages of gas or steam even under high pressure. When the perforated rotary drum 3 is fully loaded with the solid organic materials; the pressure vessel 1 is re-aligned to its horizontal position at 180° angle. Gas or steam at a temperature of 120° C. to 200° C. is admitted inside the pressure vessel 1 till the entire air inside the pressure vessel 1 is purged out. The superheated steam with temperature ranging from 450 to 750° C. generated from the steam superheater 7 is then fed via the inlet valve(s) 8 which regulates the flow of superheated steam through the feed pipe fitted with nozzle(s) or valve(s) 9. The feed pipe fitted with nozzle(s) or valve(s) 9 is anchored below the perforated rotary drum 3 inside the pressure vessel 1.

The gap between the feed pipe fitted with nozzle(s) or valve(s) 9 and the perforated rotary drum 3 will be as minimum as possible so as to render instant and effective contact of superheated steam (with minimal loss of heat) with the solid organic materials in the perforated rotary drum 3. The superheated steam thus flowing from the feed pipe fitted with nozzle(s) or valve(s) 9, enters into the perforated rotary drum 3 (through the perforated mesh or screen) thus coming into direct contact with the solid organic materials. The perforated rotary drum 3 continues to rotate at 1 to 10 RPM during the process with the continuous flow of superheated steam through the solid organic materials. The constant rotation of the perforated rotary drum 3 at 1 to 10 RPM ensures uniform direct contact of the solid organic materials with superheated steam. The RPM varies depending upon the type and nature of the solid organic material to be processed.

The reaction of the superheated steam with the solid organic material converts the solid organic materials into carbon or activated carbon. The reaction gases generated during the process are continuously evacuated from the pressure vessel 1. The reaction gases are exited through the gas exit pipe 16 via the outlet valve(s) 17 to the gas treatment unit 18. The outlet valve(s) 17 is designed to regulate the flow of reaction gases to the gas treatment unit 18 and also to regulate the pressure in the pressure vessel 1 depending upon the type of process adopted. The whole process is regulated by controlling the pressure and the temperature with the help of respective indicators i.e., pressure gauge(s) 19 and temperature indicator(s) 20.

A pressure safety valve(s) 15 is mounted in the pressure vessel 1 to safeguard the apparatus from excessive pressure build-up during its operation. After completion of the process, the solid organic materials is unloaded via the connecting chute 14 and through the feeding or removal port 13 by tilting the pressure vessel 1 downwards in the range of 30° angle to 60° angle from its horizontal position at 180° angle and upon maintaining continuous rotation of the perforated rotary drum 3.

The size of perforations in the perforated rotary drum varies in accordance with the nature or type of solid organic materials to be processed. The feed pipe with nozzle(s) or valve(s) need not necessarily be located below the perforated rotary drum, but can be at any other located point depending upon the size of the apparatus. The feed pipe need not necessarily be in a straight line but can also be in a zigzag manner. The feeding port, connecting chute shown in FIG. 1 is to facilitate feeding of solid organic materials smaller in dimension. For solid organic materials of larger dimension, the feeding port and connecting chute can be dispensed with and feeding and charging of the solid organic materials can be done by opening the conical mouth of the perforated rotary drum. The mouth of the perforated rotary drum need not necessarily be conical in shaped. The size of the apparatus is related to the quantity of solid organic materials to be processed. The number of valves, gauges, indicators mounted depends on the size of the apparatus.

Figure 2:
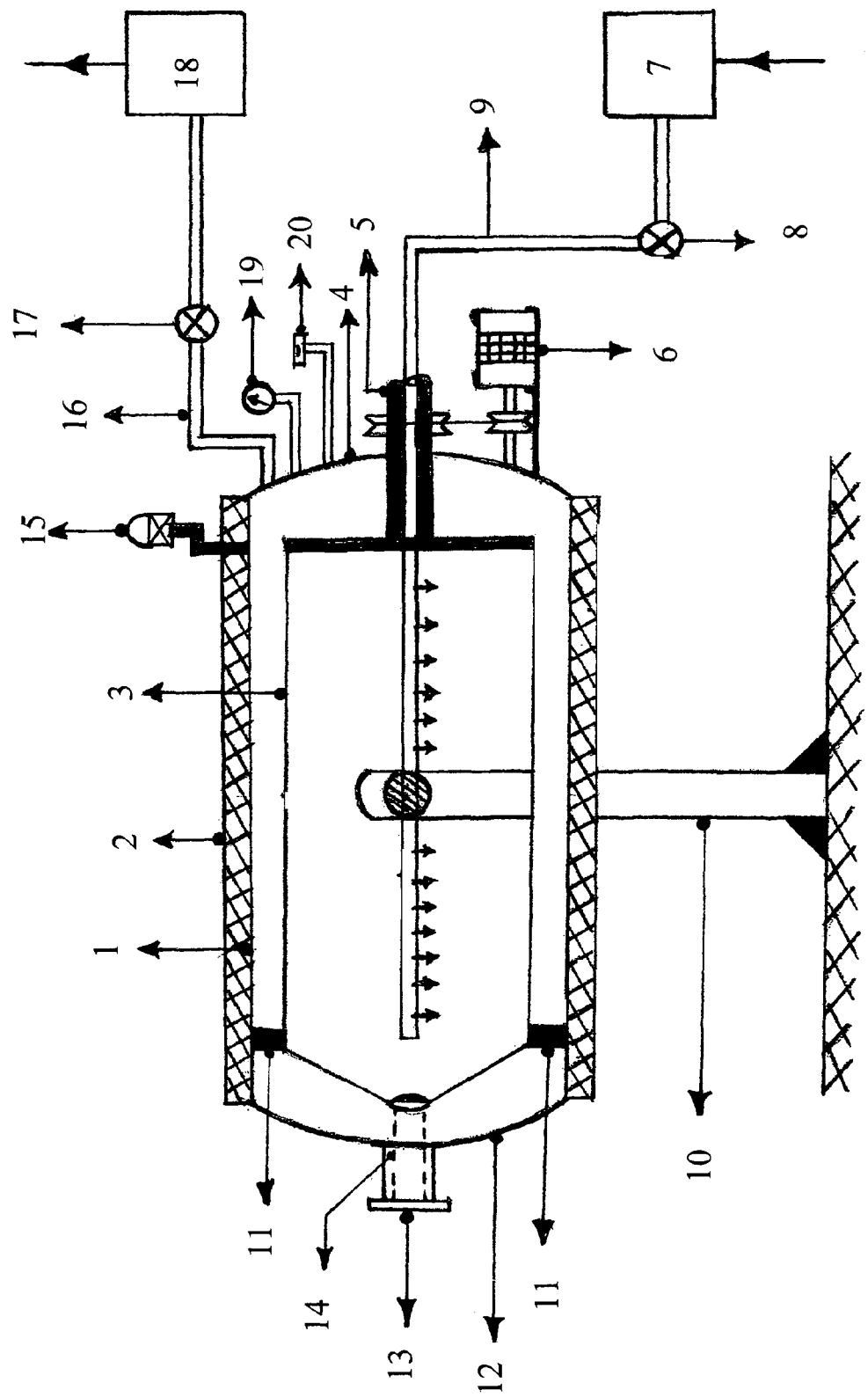
FIG. 2 demonstrates the front view of the apparatus for converting solid organic materials into carbon or activated carbon having non-perforated rotary drum according to second embodiment.

Referring to FIG. 2, to prevent heat loss, thermal insulation with protective cladding 2 is provided on the outer wall of the pressure vessel 1. Before feeding of the solid organic materials, the whole pressure vessel 1 along with its accessories supported on a tilting or swivel support 10 is tilted upwards in the range of 30° angle to 60° angle from its horizontal position at 180° angle. From the open or close door end of the pressure vessel 12, the solid organic materials is fed through the feeding or removal port 13 via the connecting chute 14 into the non-perforated rotary drum 3 encased inside the pressure vessel 1. During feeding of the solid organic materials, the rotation of the non-perforated rotary drum 3 is maintained at a specified RPM so as to facilitate uniform feed of the solid organic materials throughout the length of the non-perforated rotary drum 3. Rotation of the non-perforated rotary drum 3 is by geared motor with belt or chain drive 6 coupled to the rotating shaft 5.

The outer end of the rotating shaft 5 housed at centre of the sealed dish end 4 of the pressure vessel 1 is coupled to the geared motor with belt or chain drive 6. The inner end of the rotating shaft 5 is coupled to the sealed end of the non-perforated rotary drum 3. For non-perforated drum 3, the rotating shaft 5 has gas or steam or superheated steam feed pipe fitted with nozzle(s) or valve(s) 9 running through its centre which further extends to the inside of the non-perforated rotary drum 3. The gas or steam or superheated steam feed pipe (without nozzles or valves) 9 inside the rotating shaft 5 is thermally insulated to prevent any transmission of heat to the rotating shaft 5 and also remains stationary in its position. The gland of the rotating shaft 5 is well sealed to prevent any steam or gas leakages even under high pressure. As constant heat is developed during processing of the solid organic materials in the apparatus, hence to prevent the rotating shaft 5 from seizing; the rotating shaft 5 and its bearing or housing is constantly cooled by a cooling mechanism.

After the solid organic materials is loaded into the non-perforated rotary drum 3, the door of the feeding or removal port 13 is closed tightly to prevent any leakages of gas or steam even under high pressure. When the non-perforated rotary drum 3 is fully loaded with the solid organic materials, the pressure vessel 1 is re-aligned to its horizontal position at 180° angle. Gas or steam at a temperature of 120° C. to 200° C. is admitted inside the pressure vessel 1 till the entire air inside the pressure vessel 1 is purged out. Superheated steam with temperature ranging from 450-750° C. generated from the steam superheater 7 is then fed via the inlet valve(s) 8 which regulates the flow of superheated steam through the feed pipe fitted with nozzle(s) or valve(s) 9.

The feed pipe fitted with nozzle(s) or valve(s) 9 extends through the centre of the rotating shaft 5 into the non-perforated rotary drum 3. The area of contact between the feed pipe fitted with nozzle(s) or valve(s) 9 and the solid organic materials in the non-perforated rotary drum 3 will be as minimum as possible so as to render instant and effective contact of superheated steam (with minimal loss of heat) with the solid organic materials in the non-perforated rotary drum 3. The superheated steam thus flowing from the feed pipe fitted with nozzle(s) or valve(s) 9 enters into the non-perforated rotary drum 3 thus coming into direct contact with the solid organic materials.

The non-perforated rotary drum 3 continues to rotate at 1 to 10 RPM during the process with the continuous flow of superheated steam through the solid organic materials. The constant rotation of the non-perforated rotary drum 3 at 1 to 10 RPM ensures uniform direct contact of the solid organic materials with superheated steam. The reaction of the superheated steam with the solid organic material converts the solid organic materials into carbon or activated carbon.

The reaction gases generated during the process are continuously evacuated from the pressure vessel 1. The reaction gases are exited through the gas exit pipe 16 via the outlet valve(s) 17 to the gas treatment unit 18. The outlet valve(s) 17 is designed to regulate the flow of reaction gases to the gas treatment unit 18 and also to regulate the pressure in the pressure vessel 1 depending upon the type of process adopted. The whole process is regulated by controlling the pressure and the temperature with the help of respective indicators i.e. pressure gauge(s) 19 and temperature indicator(s) 20.

A pressure safety valve(s) 15 is mounted in the pressure vessel 1 to safeguard the apparatus from excessive pressure build-up during its operation. After completion of the process, the solid organic materials is unloaded via the connecting chute 14 and through the feeding or removal port 13 by tilting the pressure vessel 1 downwards in the range of 30° angle to 60° angle from its horizontal position at 180° angle and upon maintaining continuous rotation of the non-perforated rotary drum 3. The reaction of the superheated steam with the solid organic materials is wholly under endothermic conditions the process being oxygen-free.

Depending upon the nature or quantity or type of the material to be processed, the position of the non-perforated drum 5 can either be horizontally at 180° angle or vertically aligned at 90° angle or at any other suitable angle. The feed pipe fitted with nozzle(s) or valve(s) inside the non-perforated rotary drum need not necessarily be in a straight line but can also be in a zigzag manner. The length of feed pipe at the entry point of the non-perforated rotary drum need not necessarily be extended inside the non-perforated rotary drum; but can even be restricted at the entry point itself or can be varied depending upon the nature or quantity or type of the material to be processed. The feeding port, connecting chute shown in FIG. 2 is to facilitate feeding of the solid organic materials smaller in dimension. For solid organic materials of larger dimension, the feeding port and connecting chute can be dispensed with and feeding or charging of the solid organic materials can be done by opening the conical mouth of the non-perforated rotary drum. Mouth of the non-perforated rotary drum need not necessarily be conical in shaped. The size of the apparatus is related to the quantity of solid organic materials to be processed. The number of valves, gauges, indicators mounted depends on the size of the apparatus. The process and apparatus for converting solid organic materials into carbon or activated carbon is also used in the waste processing industry.

REFERENCE NUMERALS

1. Pressure vessel;
2. Thermal insulation with protective cladding for pressure vessel;
3. Rotary drum (perforated & non-perforated with conical mouth);
4. Sealed dish end;
5. Rotating shaft;
6. Geared motor with belt or chain drive coupled to the rotating shaft;
7. Steam superheater (non-integral part);
8. Inlet valve(s) for gas or steam or superheated steam;
9. Feed pipe fitted with nozzle(s) or valve(s) [inside pressure vessel];
10. Tilting or swivel support for tilting of the whole pressure vessel along with its accessories;
11. Cylindrical rollers;
12. Open or close door end of the pressure vessel;
13. Feeding or removal port;
14. Connecting chute;
15. Pressure safety valve(s);
16. Gas exit pipe;
17. Outlet valve(s) for gas exit;
18. Gas treatment unit (a separate unit);
19. Pressure gauge(s);
20. Temperature indicator(s).

Though the present invention was shown and described with reference to the preferred embodiments, such are merely illustrative of the present invention and are not to be construed as limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims:

The invention claimed is:

1. A process for converting solid organic materials into carbon or activated carbon, comprising the steps of:
    (a) tilting upwards a pressure vessel having thermal insulation along with its accessories supported on a tilting or swivel support;
    (b) feeding a solid organic materials to be processed through a feeding or removal port via the connecting chute into a perforated or non-perforated rotary drum encased inside the pressure vessel and upon maintaining continuous rotation of the perforated or non-perforated rotary drum;
    (c) realigning the pressure vessel to its horizontal position when the perforated or non-perforated rotary drum is fully loaded with the solid organic materials;
    (d) feeding gas or steam inside the pressure vessel till the entire air inside the pressure vessel is wholly purged out;
    (e) feeding superheated steam at a temperature ranging from 450° C. to 750° C. continuously via an inlet valve and through a feed pipe fitted with nozzles or valves into the perforated or non-perforated rotary drum thus the superheated steam comes into direct contact with the solid organic materials such that the reaction of the superheated steam with the solid organic material is wholly under oxygen-free endothermic condition and the process is done at a pressure ranging from 1 to 5 bar;
    (f) rotating constantly the perforated or non-perforated rotary drum by geared motor with belt or chain drive coupled to the rotating shaft for ensuring uniform direct contact between superheated steam and the solid organic materials wherein the perforated or non-perforated rotary drum is maintained in rotation in the range of 1 to 10 RPM;
    (g) evacuating continuously generated reaction gases from the pressure vessel through a gas exit pipe via an outlet valve to a gas treatment unit;
    (h) unloading a processed material consisting of one selected from the group consisting of carbon and activated carbon on completion of the process from the perforated or non-perforated rotary drum via a connecting chute and through the feeding or removal port by tilting the pressure vessel downwards and upon maintaining continuous rotation of the perforated or non-perforated rotary drum.

2. The process as claimed in claim 1, wherein in step (a) the pressure vessel along with its accessories is tilted upwards in the range of 30° angle to 60° angle from its horizontal position at 180° angle and in step (c) the pressure vessel is realigned at 180° angle.

3. The process as claimed in claim 1, wherein at step (d) gas or steam is admitted at temperature between 120° C. to 200° C.

4. The process as claimed in claim 1, wherein at step (e) superheated steam at a temperature ranging from 450° C. to 750° C. is fed via the inlet valve and vide the feed pipe fitted with nozzles or valves into the perforated or non-perforated rotary drum.

5. The process as claimed in claim 1, wherein at steps (b), (f) and (h) the perforated or non-perforated rotary drum is rotated constantly in the range of 1 to 10 RPM.

6. The process as claimed in claim 1, wherein entire process is regulated by controlling the pressure and temperature with the help of respective indicators.

7. The process as claimed in claim 6, wherein the efficiency of the process and the quality of the product are controlled by varying the rotation of the perforated or non-perforated rotary drum, pressure or temperature of gas or steam or super heated steam, flow rate of gas or steam or superheated steam, time or duration of the process wholly under oxygen-free endothermic condition.

8. An apparatus for converting solid organic materials into carbon or activated carbon, comprising:
- a pressure vessel horizontally mounted on a tilting or swivel support for up and down tilting movements;
- a perforated rotary drum having a conical mouth encased inside said pressure vessel;
- a sealed dish end attached to said pressure vessel at one end;
- a geared motor with a belt or chain drive coupled to said rotating shaft vide pulley or chain sprocket;
- a rotating shaft mounted at the center of said sealed dish end and RPM of said rotating shaft being between 1 to 10 and is regulated by varying either the speed of said geared motor or the dimensions of the pulley or chain sprocket;
- a steam super heater for generating superheated steam at a temperature between 450° C. to 750° C. such that reaction of the superheated steam with the solid organic material is wholly under oxygen-free endothermic condition and the pressure maintained in the apparatus is in the range of 1 to 5 bar;
- at least one inlet valve fitted to said sealed dish end for regulating the super heated steam;
- at least one feed pipe having nozzles or valves placed below the whole length of said perforated rotary drum;
- at least one cylindrical roller for supporting and keeping said conical mouth end of said perforated rotary drum centrally aligned for rotating freely inside said pressure vessel;
- an open or close door end at another end of said pressure vessel for feeding or removing solid organic materials into or from said perforated rotary drum;
- a feeding or removal port centrally located on said open or close door end for feeding or removing solid organic materials into or from said perforated rotary drum;
- a connecting chute having a smaller diameter than said conical mouth of said perforated rotary drum for facilitating free rotation of said perforated rotary drum during feeding or removal of the solid organic materials;
- at least one pressure safety valve mounted on said pressure vessel to safeguard said apparatus from excessive pressure build-up during operation;
- a gas exit pipe fitted on said sealed dish end for out flow of reaction gases generated from said pressure vessel;
- at least one outlet valve fitted to said gas exit pipe for regulating the pressure and flow of reaction gases generated during the processing of the solid organic materials;
- a gas treatment unit for treating the generated reaction gases;
- at least one pressure gauge mounted on the outer wall of said pressure vessel for indicating the pressure level in said pressure vessel; and
- at least one temperature indicator mounted on the outer wall of said pressure vessel for indicating the temperature of the gas or steam or superheated steam or reaction gases inside said pressure vessel.

9. The apparatus as claimed in claim 8, wherein outer surface of said pressure vessel including sealed dish end, open or close door end are wrapped or covered with high density thermal insulation with protective cladding to prevent or reduce heat loss and external damage.

10. The apparatus as claimed in claim 9, wherein said perforated rotary drum is mounted horizontally with one end sealed and coupled to said rotating shaft and the other end supported on cylindrical rollers to rotate freely inside said pressure vessel and said perforated rotary drum is a cylindrically shaped drum made of perforated sheet or mesh.

11. The apparatus as claimed in claim 10, wherein an annular space between said perforated rotary drum and said pressure vessel is kept minimum and one end of said perforated rotary drum is sealed and connected or coupled to said rotating shaft and other end of said conical mouth end of said perforated rotary drum is for feeding or removal of solid organic materials into or from said perforated rotary drum.

12. The apparatus as claimed in claim 11, wherein the outer end of said rotating shaft housed at the centre of the sealed dish end of said pressure vessel is coupled to said geared motor with belt or chain drive and the inner end of said rotating shaft is coupled to the sealed end of said perforated rotary drum and the gland of said rotating shaft is sealed to prevent leakages of gas or steam or superheated steam or reaction gases under high pressure and said rotating shaft is constantly cooled by cooling mechanism to prevent from seizing during processing of the solid organic material.

13. The apparatus as claimed in claim 12, wherein said sealed dish end houses said geared motor with belt or chain drive, said inlet valve, said outlet valve, said pressure gauge and said temperature indicator.

14. The apparatus as claimed in claim 8, wherein said steam superheater and gas treatment unit are non-integral parts of said apparatus.

15. The apparatus as claimed in claim 14, wherein the superheated steam generated from said steam superheater flows through said feed pipe placed below the whole length of said perforated drum inside said pressure vessel and thereafter through nozzles or valves and the nozzles or valves in said feed pipe are arranged to provide uniform distribution of superheated steam at equal temperature and pressure through the whole length of said perforated rotary drum and the superheated steam comes into direct contact with the solid organic materials during processing inside said perforated rotary drum.

16. The apparatus as claimed in claim 15, wherein said apparatus is mounted on the tilting or swivel support and for feeding the solid organic material inside said perforated rotary drum, said pressure vessel is tilted upward in the range of 30° angle to 60° angle from its horizontal position at 180° angle with either the door of said pressure vessel or said feeding or removal port in open position depending upon the dimension of the solid organic materials and during processing of the solid organic materials, said pressure vessel with said perforated rotary drum is maintained in the horizontal position at 180° angle and for removing the solid organic materials, the whole said pressure vessel is tilted downward in the range of 30° angle to 60° angle from its horizontal position at 180° angle.

17. The apparatus as claimed in claim 8, wherein said cylindrical rollers are fitted on to the inside walls of said pressure vessel so as to share and balance the load of said perforated rotary drum with the solid organic materials to ensure smooth rotation of said perforated rotary drum.

18. The apparatus as claimed in claim 9, wherein said open or close door has a feeding or removal port with connecting chute at its centre for feeding or removal of the solid organic materials of smaller dimension and the conical mouth end of said perforated rotary drum is opened for feeding or removal of the solid organic materials of larger dimension.

19. The apparatus as claimed in claim 18, wherein said feeding or removal port has a retractable connecting chute to link or connect said conical mouth end of said perforated rotary drum through which the solid organic materials flows and the door of said feeding or removal port is designed to withstand high temperature, pressure and has a sealing mechanism to prevent any leakages.

20. The apparatus as claimed in claim 19, wherein said connecting chute is of retractable type and facilitates the link between the feeding or removal port and said conical mouth end of said perforated rotary drum and during feeding or removal of the solid organic materials is linked with said connecting chute.

21. The apparatus as claimed in claim 8, wherein said pressure vessel, said perforated rotary drum, said rotating shaft and said connecting chute are cylindrical in shape.

22. The apparatus as claimed in claim 8, wherein said pressure vessel, said perforated rotary drum, said sealed dish end, said cylindrical rollers, said open or close door and said connecting chute are made of either mild or stainless steel of thick walled metal with a non-corrosive, heat, acid and chemical resistant inner lining to withstand high temperature and pressure.

23. The apparatus as claimed in claim 21, wherein said rotating shaft is made of hardened mild or stainless steel.

24. The apparatus as claimed in claim 22, wherein size of the perforations of said perforated rotary drum varies in accordance with nature and type of solid organic materials to be processed and size of said apparatus varies in accordance with the quantity of solid organic materials to be processed.

25. An apparatus for converting solid organic materials into carbon or activated carbon, comprising:
- a pressure vessel horizontally mounted on tilting or swivel support for up and down tilting movements;
- a non-perforated rotary drum having a conical mouth encased inside said pressure vessel;
- a sealed dish end attached to said pressure vessel at one end;
- a geared motor with belt or chain drive coupled to said rotating shaft vide pulley or chain sprocket;
- a rotating shaft mounted at the center of said sealed dish end and RPM of said rotating shaft being between 1 to 10 and is regulated by varying either the speed of said geared motor or the dimensions of the pulley or chain sprocket;
- a steam super heater for generating superheated steam at a temperature between 450° C. to 750° C. such that reaction of the superheated steam with the solid organic material is wholly under oxygen-free endothermic condition and the pressure maintained in the apparatus is in the range of 1 to 5 bar;
- at least one inlet valve fitted to said sealed dish end for regulating the super heated steam;
- at least one feed pipe having nozzles or valves inside said non-perforated rotary drum is placed at the centre of said rotating shaft and extends to the whole length inside of said non-perforated rotary drum, said feed pipe inside the rotating shaft is thermally insulated to prevent transmission of heat to the rotating shaft and remains stationary;
- at least one cylindrical roller for supporting and keeping said conical mouth end of said non-perforated rotary drum centrally aligned for rotating freely inside said pressure vessel;
- an open or close door end at another end of said pressure vessel for feeding or removing solid organic materials into or from said non-perforated rotary drum;
- a feeding or removal port centrally located on said open or close door end for feeding or removing solid organic materials into or from said non-perforated rotary drum;
- a connecting chute having smaller diameter than said conical mouth of said non-perforated rotary drum for facilitating free rotation of said non-perforated rotary drum during feeding or removal of the solid organic materials;
- at least one pressure safety valve mounted on said pressure vessel to safeguard said apparatus from excessive pressure build-up during its operation;
- a gas exit pipe fitted on said sealed dish end for out flow of reaction gases generated from said pressure vessel;
- at least one outlet valve fitted to said gas exit pipe for regulating the pressure and flow of reaction gases generated during the processing of the solid organic materials;
- a gas treatment unit for treating the generated reaction gases;
- at least one pressure gauge mounted on the outer wall of said pressure vessel for indicating the pressure level in said pressure vessel; and
- at least one temperature indicator mounted on the outer wall of said pressure vessel for indicating the temperature of the gas or steam or superheated steam or reaction gases inside said pressure vessel.

26. The apparatus as claimed in claim 25, wherein an outer surface of said pressure vessel including sealed dish end, open or close door end are wrapped or covered with high density thermal insulation with protective cladding to prevent or reduce heat loss and external damage.

27. The apparatus as claimed in claim 26, wherein said non-perforated rotary drum is mounted horizontally or vertically with one end sealed and coupled to said rotating shaft and the other end supported on cylindrical rollers to rotate freely inside said pressure vessel and said non-perforated rotary drum is a cylindrically shaped drum made of non-perforated sheet.

28. The apparatus as claimed in claim 27, wherein the annular space between said non-perforated rotary drum and said pressure vessel is kept minimum and one end of said non-perforated rotary drum is sealed and connected or coupled to said rotating shaft and other end of said conical mouth end of said non-perforated rotary drum is for feeding or removing of solid organic material into or from said non-perforated rotary drum.

29. The apparatus as claimed in claim 28, wherein the outer end of said rotating shaft housed at the centre of the sealed dish end of said pressure vessel is coupled to said geared motor with belt or chain drive and the inner end of said rotating shaft is coupled to the sealed end of said non-perforated rotary drum and the gland of said rotating shaft is sealed to prevent leakages of gas or steam or superheated steam or reaction gases under high pressure and said rotating shaft is constantly cooled by cooling mechanism to prevent from seizing during processing of the solid organic material.

30. The apparatus as claimed in claim 29, wherein said sealed dish end houses said geared motor with belt or chain drive, said inlet valve, said outlet valve, said pressure gauge and said temperature indicator.

31. The apparatus as claimed in claim 25, wherein said steam superheater and gas treatment unit are non-integral parts of said apparatus.

32. The apparatus as claimed in claim 31, wherein the superheated steam generated from said steam superheater flows through said feed pipe inside said pressure vessel and thereafter through nozzles or valves and the nozzles or valves in said feed pipe are arranged to provide uniform distribution of superheated steam at equal temperature and pressure through the whole length of said non-perforated rotary drum and the superheated steam comes into direct contact with the solid organic materials during processing inside said non-perforated rotary drum.

33. The apparatus as claimed in claim 32, wherein said apparatus is mounted on the tilting or swivel support and for feeding the solid organic material inside said non-perforated rotary drum, said pressure vessel is tilted upward in the range of 30° angle to 60° angle from its horizontal position at 180° angle or vertical position at 90° angle with either the door of said pressure vessel or said feeding or removal port in open position depending upon the dimension of the solid organic materials and during processing of the solid organic materials, said pressure vessel with said non-perforated rotary drum is maintained in the horizontal position at 180° angle or vertical position at 90° angle depending upon the nature and type of material to be processed and for removing the solid organic materials, the whole said pressure vessel is tilted downward in the range of 30° angle to 60° angle from its horizontal position at 180° angle or vertical position at 90° angle.

34. The apparatus as claimed in claim 25, wherein said cylindrical rollers are fitted on to the inside walls of said pressure vessel so as to share and balance the load of said non-perforated rotary drum with the solid organic materials to ensure smooth rotation of said non-perforated rotary drum.

35. The apparatus as claimed claim 26, wherein said open or close door has a feeding or removal port with connecting chute at its centre for feeding or removal of the solid organic materials of smaller dimension and the conical mouth end of said non-perforated rotary drum is opened for feeding or removal of the solid organic materials of larger dimension.

36. The apparatus as claimed in claim 35, wherein said feeding or removal port has a retractable connecting chute to link or connect said conical mouth end of said non-perforated rotary drum through which the solid organic materials flows and the door of said feeding or removal port is designed to withstand high temperature, pressure and has a sealing mechanism to prevent any leakages.

37. The apparatus as claimed in claim 36, wherein said connecting chute is retracted inside the feeding or removal port so that reaction gases flows out said non-perforated rotary drum and then exits the pressure vessel through said gas exit pipe.

38. The apparatus as claimed in claim 25, wherein said pressure vessel, said non-perforated rotary drum, said rotating shaft and said connecting chute are cylindrical in shape.

39. The apparatus as claimed in claim 25, wherein said pressure vessel, said non-perforated rotary drum, said sealed dish end, said cylindrical rollers, said open or close door and said connecting chute are made of either mild or stainless steel of thick walled metal with a non-corrosive, heat, acid and chemical resistant inner lining to withstand high temperature and pressure.

40. The apparatus as claimed in claim 38, wherein said rotating shaft is made of hardened mild or stainless steel.

41. The apparatus as claimed in claim 25, wherein said feed pipe extends through the whole length of said non-perforated rotary drum or restricted at the entry point of said non-perforated rotary drum depending upon the nature or type or quantity of the solid organic materials to be processed.

* * * * *